United States Patent
Jo et al.

(10) Patent No.: US 7,324,530 B2
(45) Date of Patent: Jan. 29, 2008

(54) ROUTING METHOD BASED ON PACKET DELAY

(75) Inventors: Min Ho Jo, Seongnam-si (KR); Tae Hwa Kim, Seoul (KR); Hyo Gon Kim, Seoul (KR); Seung Wha Yoo, Seoul (KR); Hyoung Do Kim, Seongnam-si (KR)

(73) Assignee: Daewoo Educational Foundation (KR)

( * ) Notice: Subject to any disclaimer, the term of this patent is extended or adjusted under 35 U.S.C. 154(b) by 1087 days.

(21) Appl. No.: 10/185,319

(22) Filed: Jun. 28, 2002

(65) Prior Publication Data

US 2003/0091029 A1    May 15, 2003

(30) Foreign Application Priority Data

Nov. 13, 2001 (KR) ............................... 2001-70343

(51) Int. Cl.
*H04L 12/28* (2006.01)
(52) U.S. Cl. .................................................. 370/401
(58) Field of Classification Search ................ 370/351, 370/389, 400, 401, 233, 234, 252
See application file for complete search history.

(56) References Cited

U.S. PATENT DOCUMENTS

| | | | |
|---|---|---|---|
| 6,260,072 B1 * | 7/2001 | Rodriguez-Moral | ........ 709/241 |
| 6,426,955 B1 * | 7/2002 | Gossett Dalton et al. | ... 370/401 |
| 6,584,110 B1 * | 6/2003 | Mizuta et al. | .............. 370/401 |
| 6,671,261 B1 * | 12/2003 | Cheung | ....................... 370/252 |

* cited by examiner

*Primary Examiner*—Doris H. To
*Assistant Examiner*—Kerri M. Rose
(74) *Attorney, Agent, or Firm*—Cantor Colburn LLP (57) ABSTRACT

Provided is a routing method for determining a destination in a computer network having multiple interconnected nodes, the method for measuring packet delays among remotely located gateways and processing routing in application layers of the gateways using the packet delays. The routing method based on packet delay includes the steps of setting a re-routing interval and measuring one-way delays among gateways, exchanging the measured delays among the respective gateways and forming delay time tables, calculating an average one-way delay during the re-routing interval, and if a packet is received, applying the calculated average one-way delay to a predetermined algorithm and determining a path from a source gateway to a destination gateway, the path having the minimum delay. Therefore, an improved routing performance can be achieved in real time transmitting a packet by determining the minimum delay path to a destination by measuring packet delays among remotely located nodes in application layers thereof.

9 Claims, 7 Drawing Sheets

```
if  Γ'(s,d) = 1 then
{
    f = f + 1
    if  f < 2 then  φ^{l+1}(s,d) = Ψ^{l+1}(s,d)
    else  φ^{l+1}(s,d) = d
}
elseif  Γ'(s,d) = 0 then
{
    φ^{l+1}(s,d) = Ψ^{l+1}(s,d)
    f = 0
}
```

FIG. 7

ROUTING METHOD BASED ON PACKET DELAY

BACKGROUND OF THE INVENTION

1. Field of the Invention

The present invention relates to a routing method for determining a destination in a computer network having multiple interconnected nodes, and more particularly, to a method for measuring packet delays among remotely located gateways and processing routing in application layers of the gateways using the packet delays.

2. Description of the Related Art

In general, factors affecting the quality of service (QoS) of the Internet are packet delay, packet loss, jitter and the like. In a phone-to-phone Internet telephony system, a gateway of a calling party transfers a voice call to a gateway of a called party. In transferring the voice call, the best way for ensuring the generally accepted quality is to utilize packet traffic flow control among routers. However, in consideration of characteristics of the Internet, guaranteed QoS cannot be offered by the Internet Protocol (IP) service.

As is known well, a computer network includes connection of various nodes, each having a layered protocol structure, for example, a model known as the Open Systems Internconnect (OSI) Seven-layer model. The Internet, which is the most widely being used as the computer network, includes a plurality of routers.

These routers perform routing functions according to various algorithms such as a Shortest Path First (SPF) algorithm, a Shortest Available Path First (SAPF) algorithm, a Widest Available Path First (WAPF) algorithm, a Dynamic Random Routing (DRR) algorithm and so on.

Here, the SPF algorithm is used to transfer a voice call between IP end terminals along the shortest path. However, a problem with the SPF algorithm is that a call may be blocked when the capability of the shortest path is insufficient. To overcome this problem, the SAPF or WAPF algorithm employs alternative paths in the case where the shortest path is blocked. The DRR algorithm employs both a direct path and an alternative path. That is to say, if there is a new incoming voice call, a direct path is tried first and then an alternative path is used when the direct path is not available.

However, these known routing algorithms are simply based on the number of hops or possible bands, leaving characteristics of packets for real-time traffic in an IP network out of consideration. Thus, in such Internet telephony systems requiring real-time services, QoS guarantees cannot be rendered. Also, remotely located routers constituting the Internet are owned and managed by different operators. Thus, even if an improved algorithm for real-time traffic is developed, it cannot be suited to all routers from the viewpoints of specific interest parties, for example, Internet phone service providers.

SUMMARY OF THE INVENTION

To solve the above-described problems, it is an object of the present invention to provide a packet delay based routing method in a gateway, which can improve quality of service by performing routing based on a packet delay in application layers of a gateway for specific services.

To solve the above object of the present invention, there is provided a routing method based on packet delay including the steps of setting a re-routing interval and measuring one-way delays among gateways, exchanging the measured delays among the respective gateways and forming delay time tables, calculating an average one-way delay during the re-routing interval, and if a packet is received, applying the calculated average one-way delay to a predetermined algorithm and determining a path from a source gateway to a destination gateway, the path having the minimum delay.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

The present invention will now be described more fully hereinafter with reference to the accompanying drawings, in which a preferred embodiment of the invention is shown.

Figure 1:
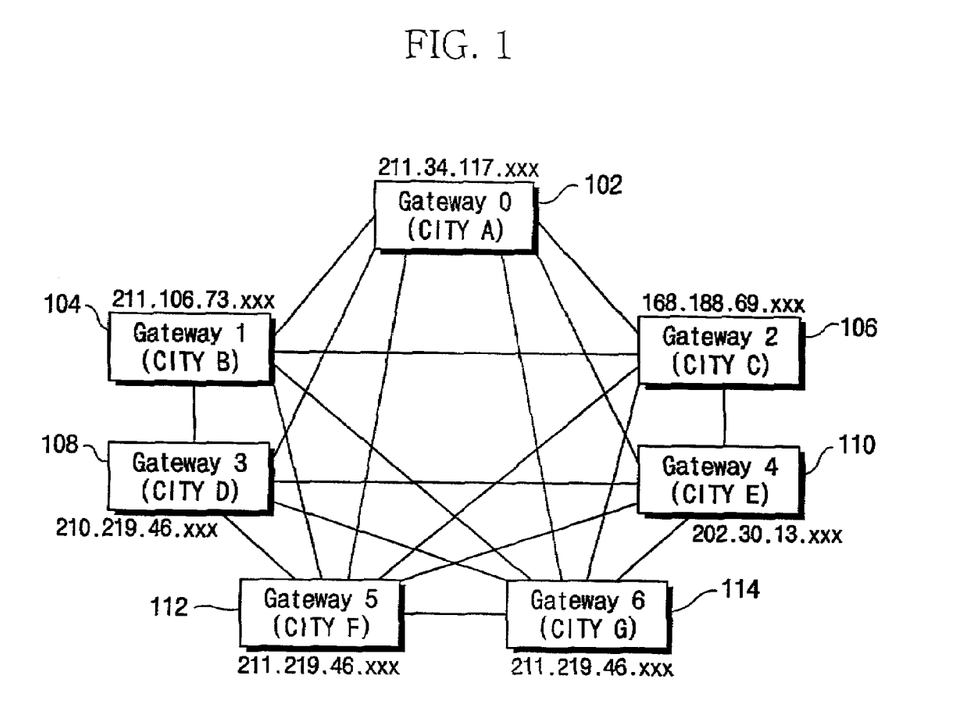
FIG. 1 shows an example of a computer network to which a routing method according to the present invention is adopted.

First, various nodes that can perform a routing function in application layers according to the present invention are referred to as gateways, and the gateways are remotely located, as shown in FIG. 1, and interconnected to construct a network. For the sake of convenient explanation, the service described in this embodiment is an Internet phone service, and the respective gateways are VoIP gateways.

Referring to FIG. 1, the IP address of a 0th gateway 102 is 211.34.117.xxx, located in a city A, the IP address of a 1st gateway 104 is 211.106.73.xxx, located in a city B, the IP address of a 2nd gateway 106 is located in a city C, the IP address of a 3rd gateway 108 is located in a city D, the IP address of a 4th gateway 110 is located in a city E, the IP address of a 5th gateway 112 is located in a city F, and the IP address of a 6th gateway 114 is located in a city G, forming a topology in which the respective gateways are all interconnected.

Figure 2:
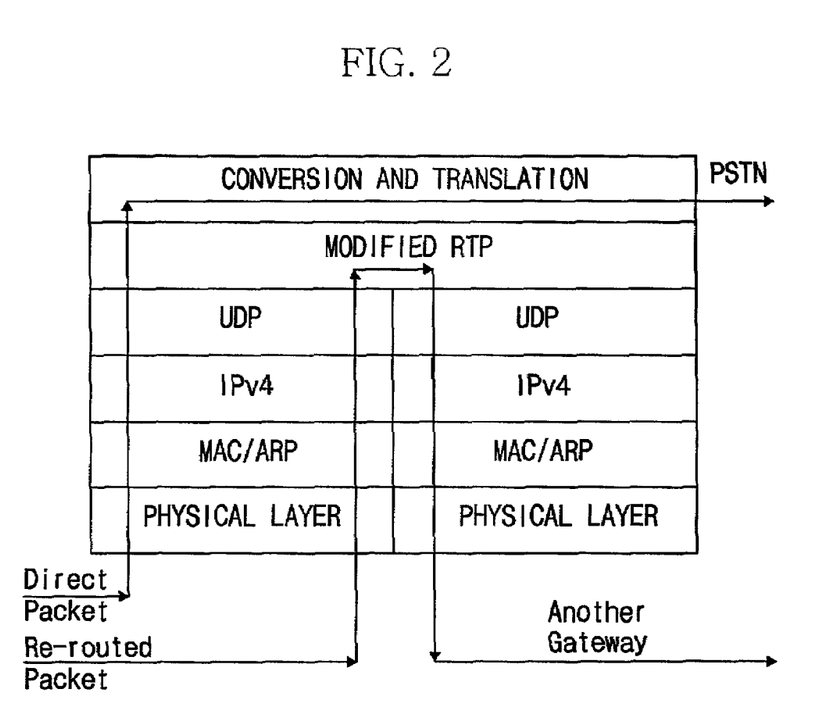
FIG. 2 shows a transmission path of a packet in a Voice Over Internet Protocol (VoIP) gateway according to the present invention.

As shown in FIG. 2, each of the respective gateways 102 through 114 has a layered protocol structure comprised of a physical layer, Media Access Control (MAC)/Address Resolution Protocol (ARP), Internet Protocol version 4 (IPv4), User Datagram Protocol (UDP), modified Real-Time control Protocol (RTP), and a conversion & translating module.

Referring to FIG. 2, an externally applied voice call packet is passed through a physical layer, MAC/ARP layers, IPv4 layer, UDP layer and RTP layer to then be converted and transmitted to a Public Switched Telephone Network (PSTN), or is re-routed in a RTP layer based on an algorithm according to the present invention to then be transmitted to another gateway.

Here, a voice call packet transmitted from a gateway to a PSTN is called a direct packet, and a packet transmitted to another gateway is called a re-routed packet, which is then re-routed in the RTP layer via the physical layer, MAC/ARP layers, IPv4 and UDP layers and is then transmitted to another gateway via the UDP, IPv4, MAC/ARP and physical layers.

The direct packet is converted into a voice signal in a gateway conversion/translating module, while the re-routed packet is straight transmitted without passing through the conversion/translating module.

In other words, in a VoIP model for phone-to-phone service, a voice signal transmitted from a PSTN to a VoIP gateway is a G.711 Pulse Code Modulation (PCM) signal. For transmission of a voice signal over the Internet, a source VoIP gateway converts a PCM signal into a G.723.1, G.729A or low-bit scream to make packets and then transmits the packets to a destination gateway near from a receiver. Then, the destination gateway disintegrates or reassembles the packets converted into G.723.1, G729A or low-bit scream to be converted into the PCM signal for transmission to the PSTN.

In an IP network, a packet is generally directly routed to a gateway of a destination IP address of the packet by a router. However, it is known that the use of an optimum alternative path can improve QoS rather than the use of a direct path.

For example, when a voice signal is transmitted from the 0th gateway 102 to the 3rd gateway 108, as shown in FIG. 1, the voice signal may be transmitted through an alternative path, such as the 1st gateway 104 or 2nd gateway 106, rather than a direct path, for example, from the 0th gateway 102 to the 3rd gateway 108, for improvement of QoS.

According to the present invention, a delay time for transmission through the direct path is compared with a delay time for transmission through the alternative path, based on the information on measured packet delay, and a better path is determined. In particular, the feature of the present invention is that routing is performed on gateways level, that is, application layers, unlike in the prior art in which routing is performed on the network level.

Figure 3:
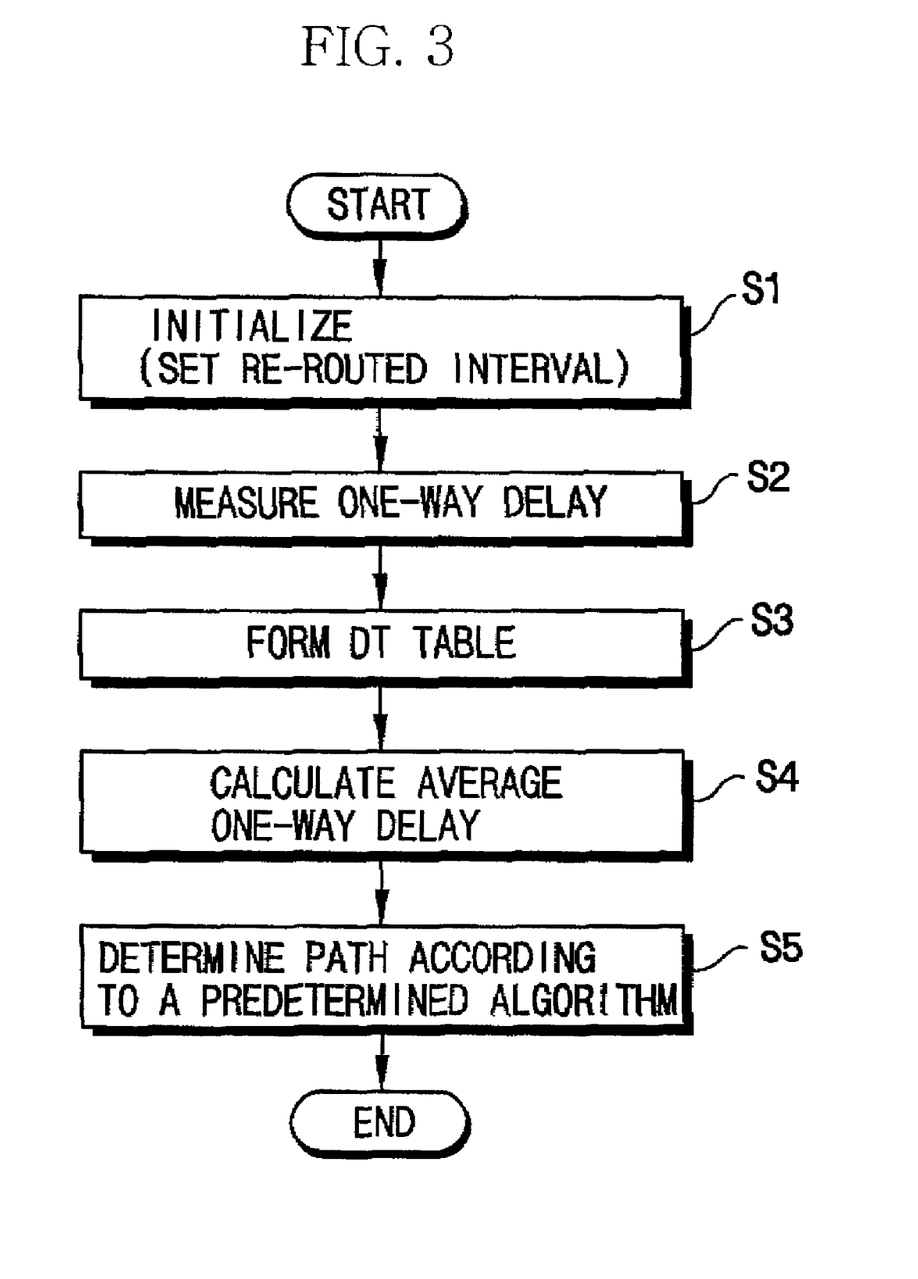
FIG. 3 is a flow chart showing a routing procedure based on a packet delay in application layers according to the present invention.

FIG. 3 is a flow chart showing a routing procedure based on a packet delay in application layers according to the present invention.

First, concepts of important terms used in the present invention will now be defined. In the present invention, each gateway utilizes a real time protocol (RTP) widely used for packet transmission in real-time media. In a H.323 gateway, since a call signaling packet is not greatly affected by a packet loss or delay, a Transmission Control Protocol (TCP) is used in the call signaling packet. However, according to the present invention, since the target packet for gateway level routing is a media packet, rather than a call signaling packet, an RTP protocol is used.

In each gateway, re-routing is performed with a constant time interval, called a re-routing interval (τ). A packet delay used to determine a path in a next re-routing time is obtained from a packet delay time (DT) in the current re-routing time.

The thus-obtained packet delay data is exchanged among all gateways in a real-time basis to be used for selecting a shortest path by a Dijkstra algorithm.

Figure 4:
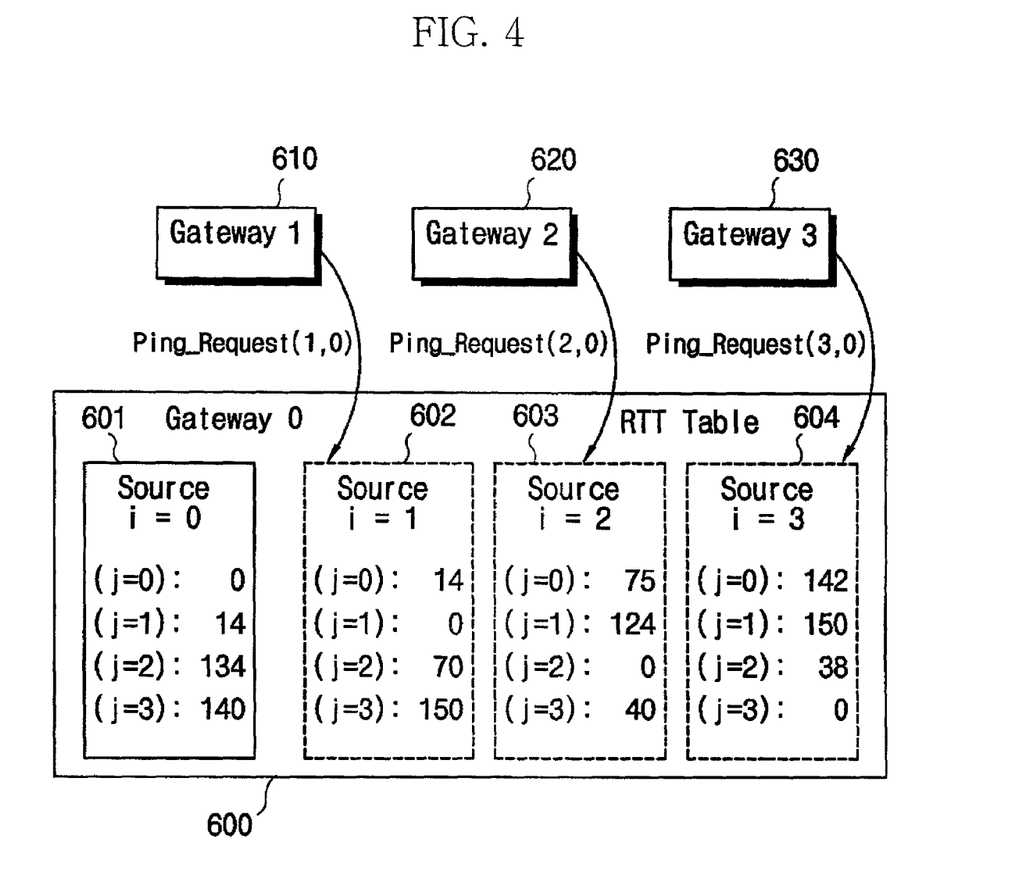
FIG. 4 shows an example of a packet delay time table according to the present invention.

In other words, each gateway includes a DT information table, as shown in FIG. 4. The DT table includes data of measured packet delays between a gateway and the other gateways.

Referring to FIG. 4, a 0th gateway table 601 (Source gateway i=0; 600) includes a packet delay between the 0th gateway and the 1st gateway (Destination gateway j=1), a packet delay between the 0th gateway and the 2nd gateway, . . . and so on. The 0th gateway 600 includes DT tables 602, 603 and 604 of the other gateways. The tables 602, 603 and 604 are transmitted from the corresponding gateways 610, 620 and 630, respectively. In other words, the respective gateways transmit their own DT tables to other gateways using a Ping_Request packet.

Now, a routing method according to the present invention will be described on the basis of the above definitions. Referring to FIG. 3, the routing method according to the present invention includes the steps of initializing (step S1), measuring a one-way delay time (DT) (step S2), forming a one-way DT table (step S3), calculating an one-way average delay (step S4) and determining a path having a minimum delay time using a predetermined algorithm (step S5). Here, the maximum delay time, instead of the average delay, may be used.

In step S1, a re-routing interval for determining a new routing path is set and information for all gateways is prepared. In other words, in step S1, the re-routing interval (τ) may be set to 1, 5, 10, 20, 30 or 60 seconds. For example, if τ=5, re-routing is performed every 5 seconds.

In step S2, one-way DT between one gateway and each of the other gateways is measured. If the DT is measured every second, RTP ping packets are transmitted to each gateway at a time interval of one second to measure the DT.

In step S3, the DTs obtained in step S2 are exchanged among the respective gateways and the DT information is tabulated by gateway. FIG. 4 shows an example of a DT table by gateway.

In step S4, an average one-way DT during a set re-routing interval is calculated by the following formula 1:

$$d_{avg}^{l}(i, j) = \begin{cases} \sum_{k=(l-1)\tau+1}^{l\tau} DT^{K}(i, j)/\tau & \text{for } l > 1 \\ 0 & \text{for } l = 1 \end{cases}$$

where l represents a re-routing sequence. In formula 1, if l=1, the pertinent routing is the first routing, which means that there is no previous delay data. Thus, the average round-trip delay is zero. If l=2 and the re-routing interval (τ) is set to 30 seconds, k=(l−1)τ+1=(2−1)30+1 and lτ=30× 2=60. Thus, when l=2, the average routing delay is obtained by the following formula 2:

$$d_{avg}^{l}(i, j) = \sum_{k=31}^{60} DT^{k}(i, j)/30$$

The obtained average one-way delay is used to determine a routing path by the Dijkstra algorithm.

Then, if a voice packet with an actual payload is received, a next gateway to which the voice packet is to be transmitted is determined by the information contained in the header of the packet and the calculated average one-way delay. Here, as the algorithm for determining the next gateway, various algorithms are employed, including 1) a Dijkstra minimum delay algorithm for average one-way delay without estimation, 2) a minimum delay algorithm for average one-way delay with estimation, 3) an improved corrected trend direction (CTD) algorithm for error correction with estimation, and the like. This will now be described in more detail.

1) In the case of using only the average one-way delay without estimation, the average one-way delay for the next gateway, that is, $d_{avg}^{l+1}(i,j)$, is not previously estimated and the next gateway is determined using only the current average one-way delay, that is, $d_{avg}^{l}(i,j)$.

It is assumed that reference symbol s denotes a source gateway for generating a voice packet, and reference symbol d denotes a destination gateway near from a receiver. These pieces of information are contained in the header of the packet.

The source gateway s determines whether the voice packet is to be transmitted through a direct path or an alternative path. The determination is made by the Dijkstra minimum delay algorithm. The gateway s determines the next gateway $\Psi^{l+1}(s,d)$ by the following formula 3:

$$\Psi^{l+1}(s,d) = D(\alpha^l[i][j], \beta^l[i][j], s, d)$$

where i and j are integers from 0 to N representing the number of total gateways.

The Dijkstra function D outputs the minimum average one-way delay $\alpha^l[i][j]$ and the next gateway number. $\beta^l[i][j]$ is an average one-way delay input to the Dijkstra function D and is represented by the following formula 4:

$$\beta^l[i][j] = d_{avg}^l(i,j)$$

where i and j are integers from 0 to N representing the number of total gateways.

2) In the case of using the minimum delay algorithm as the average one-way delay with estimation, a next path is determined with estimation using an exponential smoothing average (EXMA) as follows. The EXMA a can be arbitrarily selected. In this embodiment, α is set to 0.99802, for example. Even if the EXMA α is set to different values, e.g., 0.8 or 0.95, determination of the next path is made in a similar manner.

In this case, the current average one-way delay is not straight used in determining the next gateway, but an average one-way delay estimated during the next re-routing interval by the following formula 5 is used.

$$d_{avg}^{l+1}(i,j) = d^{l\tau}(i,j) \text{ where } d^{l\tau}(i,j) = (1-\alpha)d^{l\tau}(i,j)\alpha\ d^{l\tau-1}(i,j)$$

For example, if l=2 and the re-routing interval (τ) is set to 30 seconds, lτ=2×30=60 and lτ−1=2×(30−1)=59. Here, the estimated average one-way delay for the next third re-routing, i.e., l=3, is expressed by the following formula 6:

$$d_{avg}^3(i,j) = d^{60}(i,j) \text{ where } d^{60}(i,j) = (0.00198)d^{60}(i,j) = (0.99802)d^{59}(i,j)$$

Figure 5:
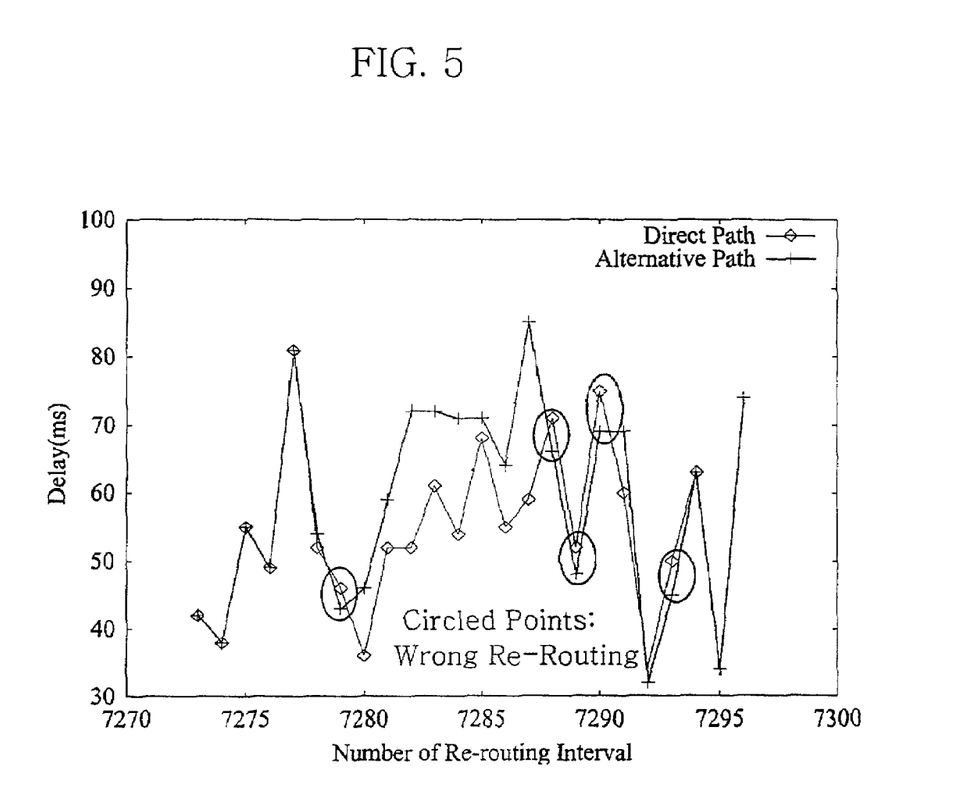
FIG. 5 is a graph showing average one-way delays computed by exponential function estimation according to an embodiment of the present invention.

The relationship between the number of re-routing interval and the average one-way delay obtained using the above-described EXMA estimation, is shown in FIG. 5. Referring to FIG. 5 in which the abscissa indicates the number of re-routing interval and the ordinate indicates the average one-way delay (unit: ms), plots representing average one-way delay with respect to the number of re-routing interval for a direct path and an alternative path, are shown. In FIG. 5, circled points indicate estimation errors, that is, wrong routing.

3) An improved corrected trend direction (CTD) algorithm for error correction with estimation can be used.

A CTD algorithm is proposed for making up for the EXMA estimation, that is, for reducing the estimation errors due to wrong EXMA estimation of an average one-way delay for a next re-routing interval.

According to mathematical experimentation, the EXMA estimation has a shortcoming that in the case where the one-way delay of a direct path is shorter than that of an alternative path or a difference in the slope between two cases is small, too slow a response is resulted.

Here, the case of occurrence of wrong re-routing, that is, $\Gamma^l(s,d)$, is obtained by the following formula 7:

$$\Gamma^l(s,d) = \begin{cases} 1 & \text{for } d_{avg}^l(s,d) - (d_{avg}^l(s, \Psi^l(s,d)) + d_{avg}^l(\Psi^l(s,d), d)) < 0 \\ 0 & \text{for } d_{avg}^l(s,d) - (d_{avg}^l(s, \Psi^l(s,d)) + d_{avg}^l(\Psi^l(s,d), d)) >= 0 \end{cases}$$

where if $\Gamma^l(s,d)$ is 1, meaning that wrong path determination is made, the one-way delay of a direct path is shorter than that of an alternative path. If $\Gamma^l(s,d)$ is 0, correct path determination is made.

Figure 6:
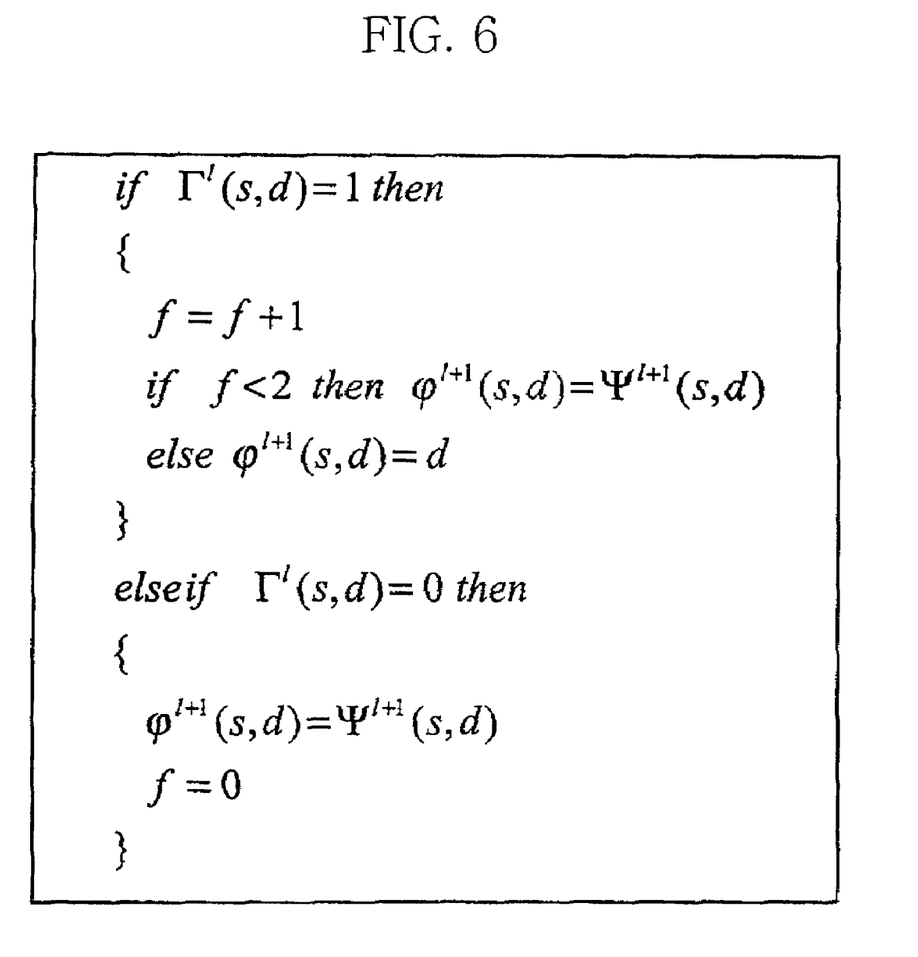
FIG. 6 is a schematic diagram showing a correct trend direction (CTD) algorithm for correcting routing errors based on the exponential function estimation according to an embodiment of the present invention.

Thus, assuming that the number of accumulated wrong path determinations is denoted by f, the path for a next gateway is corrected using the CTD algorithm in the following manner as shown in FIG. 6.

Referring to FIG. 6, if $\Gamma^l(s,d)$ is 1, f is incremented by one. In the case where the threshold value is set to 2, if f is less than 2, an alternative path is selected. Otherwise, if f is greater than or equal to 2, a direct path is selected. If $\Gamma^l(s,d)$ is 0, there is no error occurred. Thus, the selected alternative path is used and f is cleared to 0. In other words, if the threshold value is set to 2, if wrong path determination is continuously twice made, the next gateway is changed into a destination gateway. The threshold value for deciding to change the next gateway into a destination gateway, can be changed.

Figure 7:
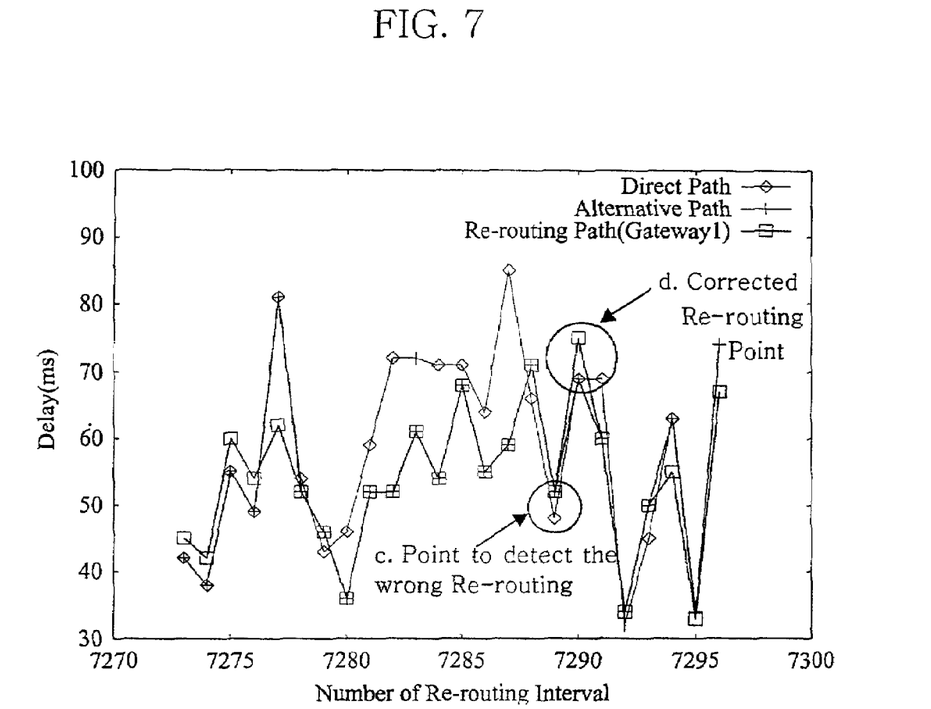
FIG. 7 is a graph showing average one-way delays computed by the algorithm shown in FIG. 6.

In the case of performing routing using the above-described CTD algorithm, the relationship between the number of re-routing interval and the average one-way delay is shown in FIG. 7. Referring to FIG. 7 in which the abscissa indicates the number of re-routing interval and the ordinate indicates the average one-way delay (unit: ms), plots representing average one-way delay with respect to the number of re-routing interval for a direct path, an alternative path and a re-routing path, are shown. In FIG. 7, circled points c indicate routing path determination errors, and circled points d indicate corrected re-routing points.

As described above, according to the present invention, an improved routing performance can be achieved in real time transmitting a packet by determining the minimum delay path to a destination by measuring packet delays among remotely located nodes in application layers thereof.

The present invention can be effectively applied to the public Internet network system in which there is a great difference in network traffic by time.

In particular, the routing method according to the present invention can provide improved QoS of the Internet phone service when applied to VoIP gateways. In fact, users of the conventional Internet phone system have been dissatisfied with the poor quality of service even with its cost efficiency. However, the routing method according to the present invention can improve the quality of the Internet phone service when applied to remotely located gateways.

What is claimed is:

1. A method for determining a routing path comprising the steps of:
    setting a re-routing interval and measuring one-way delays among gateways;
    exchanging the measured delays among the respective gateways and forming delay time tables;
    calculating an average one-way delay during the re-routing interval; and
    if a packet is received, applying the calculated average one-way delay to a Dijkstra minimum delay algorithm and determining a path from a source gateway to a destination gateway, the path having the minimum delay, wherein the calculation one-way average delay includes calculating one-way average delay in a next re-routing time from a packet delay time (DT) in the current re-routing time with estimation using exponential smoothing average (EXMA), and the step of determining the path having the minimum delay is processed in application layers of gateways.

2. The routing method according to claim 1, wherein the gateways are VoIP gateways for providing Internet phone service.

3. The routing method according to claim 1, wherein in the step of determining the path, if the number of accumulated wrong path determinations is greater than or equal to a threshold value, the path is corrected during a next re-routed interval.

4. The routing method according to claim 3, wherein the case of the routing path is wrongly determined is that $\Gamma^l(s,d)$ is discriminated as 1 according to the following formula 7, $$\Gamma^l(s,d) = \begin{cases} 1 & \text{for } d_{avg}^l(s,d) - (d_{avg}^l(s,\Psi^l(s,d)) + d_{avg}^l(\Psi^l(s,d),d)) < 0 \\ 0 & \text{for } d_{avg}^l(s,d) - (d_{avg}^l(s,\Psi^l(s,d)) + d_{avg}^l(\Psi^l(s,d),d)) \geq 0 \end{cases}$$ [formula 7]

and, the correcting path in the next re-routing interval is performed by the following CTD algorithm

[CTD ALGORITHM]
if $\Gamma^l(s,d)=1$ then
{
f=f+1
if f<2 then $\phi^{l+1}(s,d)=\psi^{l+1}(s,d)$
else $\phi^{l+1}(s,d)=d$
}
else if $\Gamma^l(s,d)=0$ then
{
$\phi^{l+1}(s,d)=\psi^{l+1}(s,d)$ f=0
}.

5. The routing method according to claim 1, wherein calculation of one-way average delay with estimation using exponential smoothing average (EXMA) includes using the following formula 5:

$$d_{avg}^{l+1}(i,j) = \hat{d}^{l\tau}(i,j) \text{ where } \hat{d}^{l\tau}(i,j) = (1-\alpha)d^{l\tau}(i,j) + \alpha \hat{d}^{l\tau-1}(i,j)$$ [formula 5]

where, $\tau$ is a re-routing interval, $\alpha$ is EXMA, l is the present re-routing order, and l+1 is the next re-routing order.

6. A method for determining a routing path comprising the steps of:
    setting a re-routing interval and measuring one-way delays among gateways;
    exchanging the measured delays among the respective gateways and forming delay time tables;
    calculating a maximum one-way delay during the re-routing interval; and
    if a packet is received, applying the calculated maximum one-way delay to a Dijkstra algorithm and determining a path from a source gateway to a destination gateway, the path having the minimum delay, wherein the calculation of maximum one-way delay includes calculating maximum one-way average delay in a next re-routing time from a packet delay time (DT) in the current re-routing time with estimation using exponential smoothing average (EXMA), and the step of determining the path having the minimum delay is processed in application layers of gateways.

7. The routing method according to claim 6, wherein the gateways are VoIP gateways for providing Internet phone service.

8. The routing method according to claim 6, wherein in the step of determining the path, if the number of accumulated wrong path determinations is greater than or equal to a threshold value, the path is corrected during a next re-routed interval.

9. The routing method according to claim 6, wherein calculation of maximum average delay with estimation using exponential smoothing average (EXMA) includes using the following formula 5:

$$d_{avg}^{l+1}(i,j) = \hat{d}^{l\tau}(i,j) \text{ where } \hat{d}^{l\tau}(i,j) = (1-\alpha)d^{l\tau}(i,j) + \alpha \hat{d}^{l\tau-1}(i,j)$$ [formula 5]

where, $\tau$ is a re-routing interval, $\alpha$ is EXMA, l is the present re-routing order, and l+1 is the next re-routing order.

* * * * *